United States Patent [19]

Murai et al.

[11] Patent Number: 4,626,874

[45] Date of Patent: Dec. 2, 1986

[54] LIQUID LEVEL DETECTOR FOR INK JET PRINTER

[75] Inventors: Toshiharu Murai, Yokohama; Koichiro Jinnai, Kawasaki; Minoru Ameyama, Yokohama; Michio Umezawa, Kawasaki, all of Japan

[73] Assignee: Ricoh Company, Ltd., Tokyo, Japan

[21] Appl. No.: 751,527

[22] Filed: Jul. 3, 1985

[30] Foreign Application Priority Data

Jul. 6, 1984 [JP] Japan ............................... 59-141153

[51] Int. Cl.[4] ............................................ G01D 18/00

[52] U.S. Cl. ............................ 346/140 R; 73/304 R; 137/392

[58] Field of Search ............... 346/140, 75; 73/304 R, 73/304 C; 137/392

[56] References Cited

U.S. PATENT DOCUMENTS 3,835,881 9/1974 Dal ................................. 137/392 X 4,202,267 5/1980 Heinzl ............................ 346/140 X

*Primary Examiner*—Joseph W. Hartary

*Attorney, Agent, or Firm*—Oblon, Fisher, Spivak, McClelland, & Maier

[57] ABSTRACT

An ink level detector for use with an ink jet printer includes two electrodes for sensing changes in ink level inside an ink reservoir due to consumption. Fresh ink is supplied to the reservoir from an ink cartridge which is mounted in an upper wall of the reservoir. At least one of the two electrodes is positioned adjacent to a location where the cartridge is mounted to the upper wall of the reservoir.

10 Claims, 3 Drawing Figures

LIQUID LEVEL DETECTOR FOR INK JET PRINTER

BACKGROUND OF THE INVENTION

The present invention relates to a detector for detecting the level of stored liquid and, more particularly, to an ink level detector for use with an ink jet printer.

A prior art ink level detector used with an ink jet printer comprises two spaced rod-like electrodes which extend downwardly from an upper wall of an ink reservoir. Ink is supplied from an ink cartridge into the ink reservoir in which the two electrodes are positioned. When the ink in the reservoir has been consumed to such an extent that one of the electrodes does not make contact with the ink at all, that is, the electrode is clear of the ink surface, the detector determines that a "no ink" condition has been reached. Specifically, in the prior art ink level detector, the two electrodes are dipped in the ink in the reservoir to detect an ink level in terms of electrical resistance therebetween.

In such a prior art ink level detector, the electrodes are located in a position remote from the ink cartridge which is mounted on the ink reservoir and this brings about a problem. That is, once the ink level fluctuates due to movement of the ink inside the reservoir or the printer and, therefore, the reservoir is tilted, the electrodes are apt to sense the ink at a false level, resulting in scattering in level detection. Meanwhile, as regards a certain kind of ink jet printer, the viscosity of ink increases as it is repeatedly circulated and such has heretofore been compensated for by discarding a predetermined amount of ink. This brings about another problem that since no fresh ink is supplemented after the ink cartridge has been emptied, the viscosity sharply increases to affect the quality of data to be printed out.

SUMMARY OF THE INVENTION

It is therefore an object of the present invention to provide a liquid level detector which detects a liquid level in a reservoir without errors due to, for example, inclination of an apparatus with which the detector is associated.

It is another object of the present invention to provide an ink level detector which detects an ink level in an ink reservoir without errors due to, for example, inclination of an apparatus with which the detector is associated.

It is another object of the present invention to provide an ink level detector which detects a "no ink" condition immediately after an ink cartridge has been emptied.

It is another object of the present invention to provide a generally improved liquid level detector for an ink jet printer.

In accordance with one aspect of the present invention, there is provided a liquid level detector for detecting a level of stored liquid which comprises a housing for storing the liquid, a supplementary liquid cartridge mounted in an opening formed through an upper wall of the housing for supplying supplementary liquid to the housing, and two electrodes dipped in the liquid for detecting the level of the liquid. At least one of the two electrodes is positioned adjacent to a location where the supplementary liquid cartridge is mounted on the upper wall of the housing.

In accordance with another aspect of the present invention, there is provided an ink level detector for an ink jet printer which comprises a housing for storing ink, a fresh ink cartridge mounted in an opening formed through an upper wall of the housing for supplying fresh ink to the housing, and two electrodes dipped in the ink for detecting the level of the ink. At least one of the two electrodes is positioned adjacent to a location where the fresh ink cartridge is mounted on the upper wall of the housing.

The above and other objects, features and advantages of the present invention will become more apparent fom the following detailed description taken with the accompanying drawings.

DESCRIPTION OF THE PREFERRED EMBODIMENTS

While the liquid level detector for an ink jet printer of the present invention is susceptible of numerous physical embodiments, depending upon the environment and requirements of use, a substantial number of the herein shown and described embodiment have been made, tested and used, and all have performed in an eminently satisfactory manner.

Figure 1:
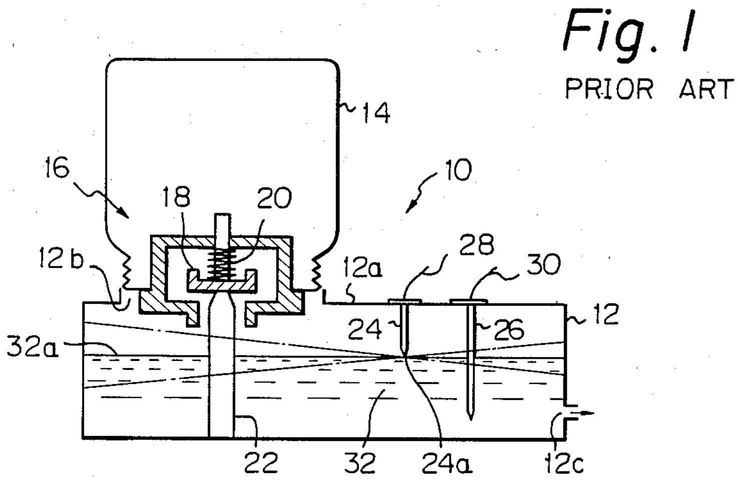
Fig. 1 PRIOR ART
FIG. 1 is a view of a prior art ink level detector associated with an ink jet printer.

Referring to FIG. 1 of the drawings, a prior art ink level detector installed in an ink jet printer is shown and generally designated by the reference numeral 10. The detector 10 comprises an ink reservoir 12 including an upper wall 12*a* which is provided with an opening 12*b*, and an ink cartridge 14 which is mounted in the opening 12*b* of the reservoir 12. An ink supply adjusting mechanism 16 is arranged inside an ink supply opening, or mouth, which is provided in a lower portion of the cartridge 14. The mechanism 16 is made up of a stop 18 for selectively closing the mouth of the cartridge 14, a spring 20 constantly biasing the stop 18 toward the mouth, and a drive member 22 for driving the stop 18 against the action of the spring 20 to open the mouth of the cartridge 14. Two rod-like electrodes 24 and 26 having different lengths are supported by the upper wall 12*a* of the reservoir 12 in a position remote from the ink cartridge 14. Leads 28 and 30 extend respectively from the electrodes 24 and 26 to deliver output signals of the electrodes. Ink inside the reservoir 12 is communicated to a head of the ink jet printer through a port 12*c* which is formed in a lower portion of the reservoir 12.

In operation, the electrodes 24 and 26 are dipped in ink 32 inside the reservoir 12 so that an amount of the ink 32 in the reservoir 12 is sensed in terms of variation in the resistance between the electrodes. Specifically, the resistance differs from a condition wherein both the electrodes 24 and 26 remain under the ink surface to a condition wherein the tip 24*a* of the shorter electrode 24 is clear of the ink surface 32*a* due to the decrease of ink inside the reservoir 12.

As previously stated, this type of prior art ink level detector has a problem left unsolved due to the position of the electrodes 24 and 26 which is remote from the ink cartridge 14 mounted on the reservoir 12. When the ink surface 32*a* fluctuates due to inclination of the detector 10 or movement of the ink 32, the contact between the electrode 24 and the ink 32 becomes unstable allowing the detector 10 to sense a false ink surface other than a correct one.

Figure 2:
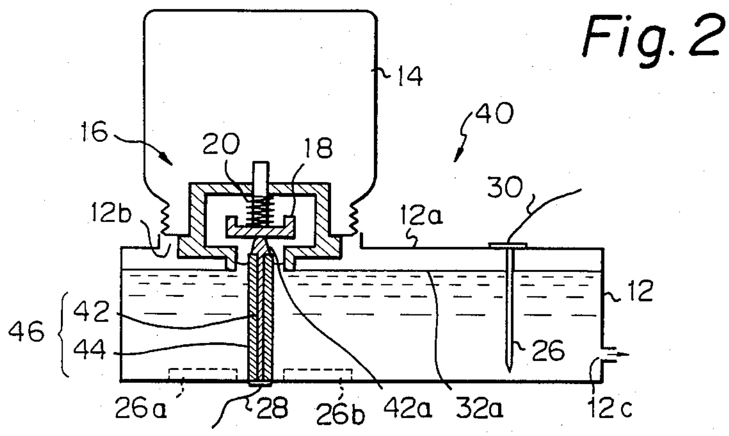
FIG. 2 is a view of an ink level detector embodying the present invention.
Figure 3:
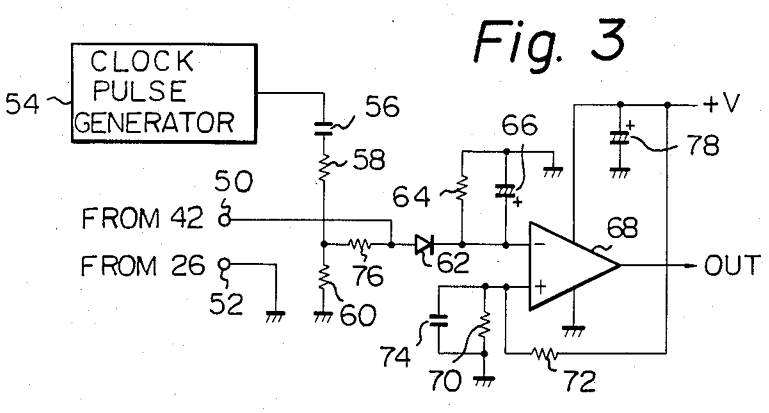
FIG. 3 is a diagram showing a specific example of an electric circuit for processing signals which are output from the ink level detector of the present invention.

Referring to FIGS. 2 and 3, an ink level detector embodying the present invention is shown. In these drawings, the same or similar structural elements as those shown in FIG. 1 are designated by like reference numerals.

The detector, generally 40, of the present invention includes an electrode 42 which corresponds to the electrode 24 of FIG. 1 and is arranged in a position where the drive member 22 has been positioned in FIG. 1. The electrode 42 is covered with an insulating member 44 made of resin or the like except for its tip portion, constituting a drive member 46 in cooperation with the insulating member 44. The electrode may be provided with a smaller diameter than the insulating member or a sense portion 42*a* at the tip of the electrode 42 may be provided with water-repellent treatment, in order to promtply dissipate ink. Further, the electrode 26 may be arranged around the electrode 42 in a circular configuration for the purpose of lowering the impedance of ink and, thereby, enhancing immunity to noise. In this manner, at least one of the electrodes of the ink level detector in accordance with the present invention is located adjacent to the mouth of the cartridge 14, so that a correct ink level can constantly be detected.

Referring to FIG. 3, a specific example of an electric circuit adapted to process output signals of the detector 40 is shown. The circuit includes terminals 50 and 52 to which signals from the electrodes 42 and 26 are applied over leads 28 and 30, respectively. A clock pulse generator 54 generates TTL-level clock pulses and delivers them to a capacitor 56 which functions to cut DC components. The pulses output from the capacitor 56 are divided by resistors 58 and 60 to an adequate value, then rectified by a diode 62, then smoothed by a resistor 64 and a capacitor 66, and then applied to a comparator 68. Resistors 70 and 72 serve to provide a reference voltage which is coupled to the comparator 68, while a capacitor 74 functions to remove fluctuation of the reference voltage due to noise which is derived from a power source voltage. The output of the comparator 68 is routed to a controller (not shown) of the ink jet printer to be processed thereby. A resistor 76 has its resistance selected in conformity to that of the ink. Insofar as the amount of ink inside the reservoir 12 is large enough to maintain the electrodes 42 and 26 electrically conducted, the voltage at a signal terminal (inverting input in FIG. 3) of the compartor 68 is lower than the reference voltage (voltage at the non-inverting input), maintaining the output of the comparator 68 high level. As the ink runs out to increase the resistance between the electrodes 44 and 26, the voltage at the inverting input of the comparator 68 rises beyond the reference voltage at the non-inverting input with the result that the output of the comparator 68 is inverted to low level. The reference numeral 78 designates a capacitor which is connected to a power source +V.

In summary, it will be seen that the present invention provides a liquid level detector for an ink jet printer which is operable with a minimum of scattering in the detection of the critical liquid level 32*a* due to the electrode 42 which is positioned near the stop 18 of the cartridge 14. Another advantage is that because the detector detects a "no ink" condition immediately after the cartridge 14 has been emptied, it serves to prevent the ink viscosity from being undesirably increased. In addition, such advantages are attainable without sacrificing the economy because the cartridge 14 is empty when a "no ink" condition is determined.

Various modifications will become possible for those skilled in the art after receiving the teachings of the present disclosure without departing from the scope thereof.

What is claimed is:

1. A liquid level detector for detecting a level of stored liquid, comprising:
   - a housing for storing the liquid;
   - a supplementary liquid cartridge mounted in an opening formed through an upper wall of said housing for supplying supplementary liquid to said housing; and
   - two electrodes dipped in the liquid for detecting the level of the liquid;
   - at least one of said electrodes being positioned at the location where the supplementary liquid cartridge is mounted on the upper wall of the housing.

2. A liquid level detector as claimed in claim 1, further comprising a supplementary liquid adjusting mechanism for adjusting supply of the supplementary liquid to the housing by opening and closing a liquid supply opening of the cartridge.

3. A liquid level detector as claimed in claim 2, wherein the supplementary liquid adjusting mechanism comprises a stop for closing the liquid supply opening of the cartridge, a spring for biasing said stop, and a drive member for driving the stop against said spring.

4. A liquid level detector as claimed in claim 1, wherein the other electrode is located away from the position where the cartridge is mounted to the upper wall of the housing.

5. A liquid level detector as claimed in claim 4, wherein said other electrode is mounted in the upper wall of the housing.

6. A liquid level detector as claimed in claim 1, wherein the liquid comprises ink which is used with an ink jet printer.

7. An ink level detector for an ink jet printer, comprising:
   - a housing for storing ink;
   - a fresh ink cartridge mounted in an opening formed through an upper wall of said housing for supplying fresh ink to said housing; and
   - two electrodes dipped in the ink for detecting the level of the ink;
   - at least one of said two electrodes being positioned at the location where the fresh ink cartridge is mounted on the upper wall of the housing.

8. A liquid level detector for detecting a level of stored liquid, comprising:
   - a housing for storing the liquid;
   - a supplementary liquid cartridge mounted in an opening formed through an upper wall of said housing for supplying supplementary liquid to said housing; and
   - two electrodes dipped in the liquid for detecting the level of the liquid;
   - at least one of said two electrodes being positioned adjacent to a location where the supplementary liquid cartridge is mounted on the upper wall of the housing; and
   - a supplementary liquid adjusting mechanism for adjusting supply of the supplementary liquid to the housing by opening and closing a liquid supply opening of the cartridge, including a stop for closing the liquid supply opening of the cartridge, a spring for biasing said stop, and a drive member for driving the stop against said spring, wherein said one electrode constitutes a part of the drive member.

9. A liquid level detector as claimed in claim 8, wherein the drive member comprises an insulating member which covers said one electrode except for a tip portion of the electrode.

10. A liquid level detector as claimed in claim 9, wherein said tip portion of said one electrode is provided with water-repellent treatment.

* * * * *